US012639313B2

(12) United States Patent
Delamare et al.

(10) Patent No.: US 12,639,313 B2
(45) Date of Patent: *May 26, 2026

(54) OFFLOADING GRAPH COMPONENTS TO PERSISTENT STORAGE FOR REDUCING RESIDENT MEMORY IN DISTRIBUTED GRAPH PROCESSING

(71) Applicant: Oracle International Corporation, Redwood Shores, CA (US)

(72) Inventors: Arnaud Delamare, Zurich (CH); Irfan Bunjaku, Zurich (CH); Vasileios Trigonakis, Zurich (CH); Calin Iorgulescu, Zurich (CH); Tomas Faltin, Prague (CZ); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/934,068

(22) Filed: Oct. 31, 2024

(65) Prior Publication Data

US 2025/0053563 A1     Feb. 13, 2025

Related U.S. Application Data

(63) Continuation of application No. 18/211,613, filed on Jun. 20, 2023, now Pat. No. 12,174,835.
(Continued)

(51) Int. Cl.
G06F 17/30     (2006.01)
G06F 16/22     (2019.01)
(Continued)

(52) U.S. Cl.
CPC ........ *G06F 16/24552* (2019.01); *G06F 16/22* (2019.01); *G06F 16/2343* (2019.01); *G06F 16/24542* (2019.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 8,825,581 B2     9/2014   Duftler
8,938,599 B2 *   1/2015   Lee ..................... G06F 12/0284
                                                     711/170
(Continued)

OTHER PUBLICATIONS

Delamare, U.S. Appl. No. 18/211,613, filed Jun. 20, 2023, Non-Final Rejection, Mar. 6, 2024.
(Continued)

*Primary Examiner* — Hung D Le
(74) *Attorney, Agent, or Firm* — Hickman Becker Bingham Ledesma LLP; Stephen Roy Tkacs

(57)     ABSTRACT

A storage manager maintains metadata for a plurality of graph components including, for each given graph component, a memory-state indicator that indicates whether the given graph component is stored in memory. The storage manager identifies a set of graph components required to execute a graph processing operation and identifies, based on the metadata, a first subset of the set of graph components that are stored in the memory and a second subset of the set of graph components that are not stored in the memory. The storage manager loads the second subset of graph components into memory and initiates execution of the graph processing operation using the set of graph components in memory.

20 Claims, 9 Drawing Sheets

Related U.S. Application Data

(60) Provisional application No. 63/419,826, filed on Oct. 27, 2022.

(51) Int. Cl.

| | |
|---|---|
| *G06F 16/23* | (2019.01) |
| *G06F 16/2453* | (2019.01) |
| *G06F 16/2455* | (2019.01) |

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 9,960,973 | B1 | 5/2018 | Faibish | |
| 10,976,965 | B1 | 4/2021 | Houlemarde | |
| 11,810,001 | B1 | 11/2023 | Tang | |
| 11,829,294 | B2 | 11/2023 | Lutz | |
| 2008/0049641 | A1* | 2/2008 | Edwards | H04L 43/0852 |
| | | | | 370/252 |
| 2011/0137930 | A1* | 6/2011 | Hao | G06F 16/9024 |
| | | | | 707/769 |
| 2012/0173845 | A1 | 7/2012 | Venkataramani | |
| 2013/0246731 | A1 | 9/2013 | Lee | |
| 2014/0074876 | A1 | 3/2014 | Venkataramani | |
| 2015/0006619 | A1 | 1/2015 | Banadaki | |
| 2016/0063132 | A1 | 3/2016 | Chen | |
| 2016/0179887 | A1 | 6/2016 | Lisonbee | |
| 2016/0335371 | A1 | 11/2016 | Rao | |
| 2017/0124221 | A1 | 5/2017 | Song | |
| 2017/0147448 | A1 | 5/2017 | Kizhakkel | |
| 2018/0039673 | A1 | 2/2018 | Chen | |
| 2018/0039710 | A1 | 2/2018 | Chen | |
| 2018/0129613 | A1 | 5/2018 | Faldu | |
| 2018/0189269 | A1 | 7/2018 | Quirk | |
| 2019/0026334 | A1 | 1/2019 | Ma | |
| 2019/0278808 | A1 | 9/2019 | Xia | |
| 2019/0279086 | A1 | 9/2019 | Nicol | |
| 2019/0354526 | A1 | 11/2019 | Roth | |
| 2019/0370289 | A1 | 12/2019 | Van Rest | |
| 2020/0073868 | A1 | 3/2020 | Delamare | |
| 2020/0117762 | A1 | 4/2020 | Haprian | |
| 2020/0201862 | A1 | 6/2020 | Lutz | |
| 2020/0201910 | A1 | 6/2020 | Gavaudan | |
| 2020/0264866 | A1 | 8/2020 | Collins | |
| 2020/0274880 | A1 | 8/2020 | Badawy | |
| 2020/0280564 | A1 | 9/2020 | Badawy | |
| 2020/0285643 | A1 | 9/2020 | Kadiam | |
| 2020/0293372 | A1* | 9/2020 | Haprian | G06F 11/3006 |
| 2020/0401444 | A1 | 12/2020 | Hirota | |
| 2021/0004374 | A1 | 1/2021 | Xia | |
| 2021/0034241 | A1 | 2/2021 | Ray | |
| 2021/0049209 | A1 | 2/2021 | Shi | |
| 2021/0073287 | A1 | 3/2021 | Hunter | |
| 2021/0096921 | A1 | 4/2021 | Banerjee | |
| 2021/0224235 | A1 | 7/2021 | Arnaboldi | |
| 2021/0240705 | A1* | 8/2021 | Trigonakis | G06F 16/24526 |
| 2021/0286790 | A1 | 9/2021 | Lozi | |
| 2021/0365499 | A1 | 11/2021 | Matiushkin | |
| 2021/0392073 | A1 | 12/2021 | Tonkovic | |
| 2021/0392172 | A1 | 12/2021 | Badawy | |
| 2021/0397965 | A1 | 12/2021 | Zhang | |
| 2022/0012060 | A1 | 1/2022 | Fok | |
| 2022/0044122 | A1 | 2/2022 | Mostafa | |
| 2022/0114456 | A1* | 4/2022 | Nouri | G06F 9/4881 |
| 2022/0206766 | A1 | 6/2022 | Hsu | |
| 2022/0215055 | A1 | 7/2022 | Delamare | |
| 2022/0229677 | A1 | 7/2022 | Heirman | |
| 2022/0253482 | A1* | 8/2022 | Enrici | G06F 9/5016 |
| 2022/0261357 | A1 | 8/2022 | Gabbai | |
| 2022/0284056 | A1 | 9/2022 | Hilloulin | |
| 2022/0414012 | A1 | 12/2022 | Lutz | |
| 2023/0005096 | A1* | 1/2023 | Gurfinkel | G06T 1/60 |
| 2023/0005097 | A1* | 1/2023 | Gurfinkel | G06F 9/545 |
| 2023/0109463 | A1 | 4/2023 | Hilloulin | |
| 2023/0237047 | A1 | 7/2023 | Trigonakis | |
| 2023/0259774 | A1 | 8/2023 | Wang | |
| 2023/0367814 | A1 | 11/2023 | Psaroudakis | |
| 2023/0376534 | A1 | 11/2023 | Dann | |
| 2024/0028593 | A1* | 1/2024 | Sharma | G06F 16/2264 |

OTHER PUBLICATIONS

Oracle, "PGQL Property Graph Query Language", https://pgql-lang.org/, 5 pages.
Databricks, "Apache Spark GraphFrames", https://docs.databricks.com/spark/latest/graph-analysis/graphframes/graph-analysis-tutorial.html, 2023, 2 pages.
"The PageRank Citation Ranking: Bringing Order to the Web", http://ilpubs.stanford.edu:8090/422/, Jan. 29, 1998, 17 pages.
"Neo4j", https://neo4j.com/, 10 pages.
"Dijkstra's algorithm", Wikipedia, https://en.wikipedia.org/wiki/Dijkstra%27s_algorithm, 13 pages.

* cited by examiner

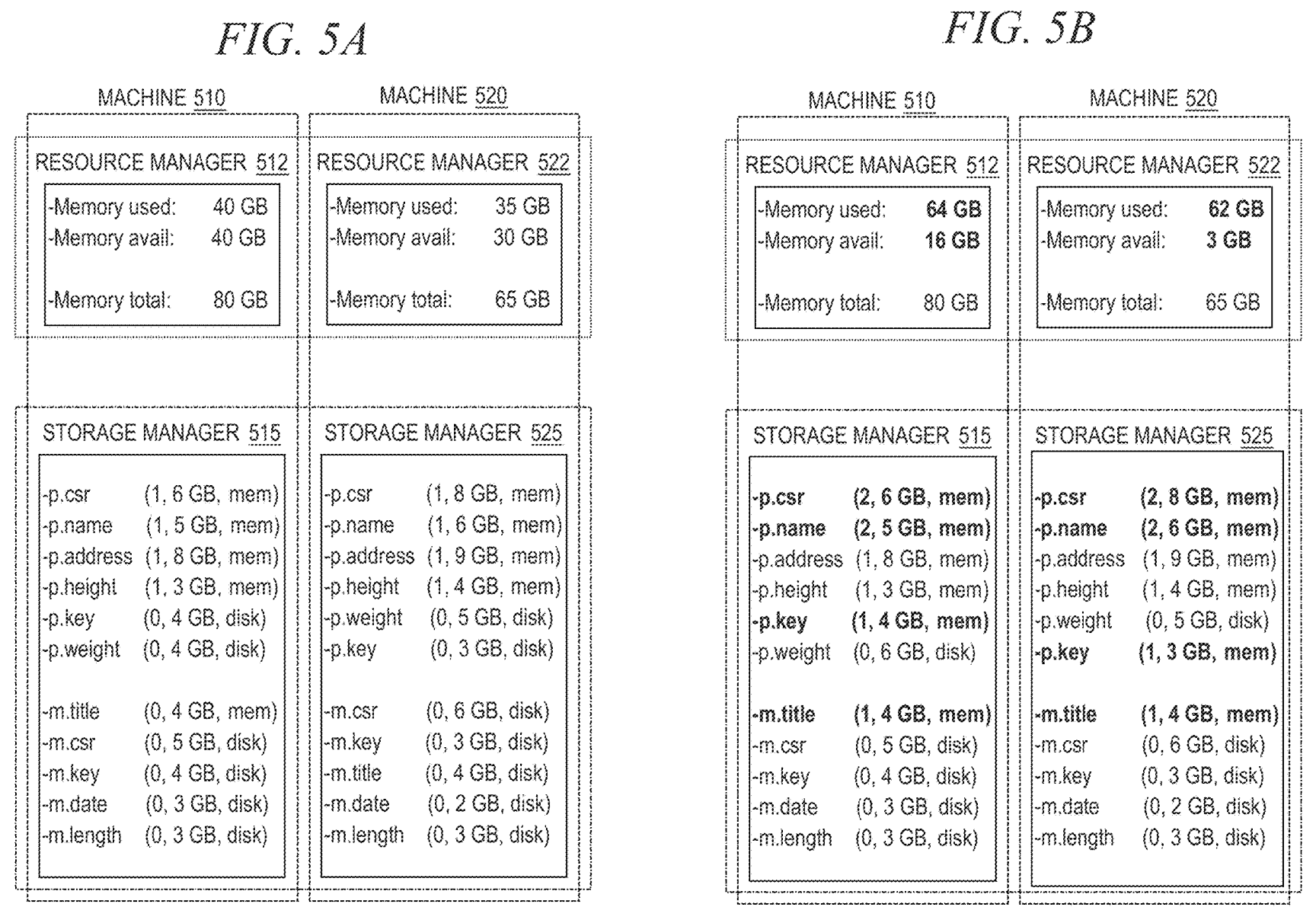

MACHINE 510

RESOURCE MANAGER 512

-Memory used:    64 GB
-Memory avail:    16 GB

-Memory total:    80 GB

STORAGE MANAGER 515

-p.csr        (2, 6 GB, mem)
-p.name       (2, 5 GB, mem)
-p.address    (1, 8 GB, mem)
-p.height     (1, 3 GB, mem)
-p.key        (1, 4 GB, mem)
-p.weight     (0, 6 GB, disk)

-m.title      (1, 4 GB, mem)
-m.csr        (0, 5 GB, disk)
-m.key        (0, 4 GB, disk)
-m.date       (0, 3 GB, disk)
-m.length     (0, 3 GB, disk)

MACHINE 520

RESOURCE MANAGER 522

-Memory used:    62 GB
-Memory avail:    3 GB

-Memory total:    65 GB

STORAGE MANAGER 525

-p.csr        (2, 8 GB, mem)
-p.name       (2, 6 GB, mem)
-p.address    (1, 9 GB, mem)
-p.height     (1, 4 GB, mem)
-p.weight     (0, 5 GB, disk)
-p.key        (1, 3 GB, mem)

-m.title      (1, 4 GB, mem)
-m.csr        (0, 6 GB, disk)
-m.key        (0, 3 GB, disk)
-m.date       (0, 2 GB, disk)
-m.length     (0, 3 GB, disk)

FIG. 5A

MACHINE 510

RESOURCE MANAGER 512

-Memory used:    40 GB
-Memory avail:    40 GB

-Memory total:    80 GB

STORAGE MANAGER 515

-p.csr        (1, 6 GB, mem)
-p.name       (1, 5 GB, mem)
-p.address    (1, 8 GB, mem)
-p.height     (1, 3 GB, mem)
-p.key        (0, 4 GB, disk)
-p.weight     (0, 4 GB, disk)

-m.title      (0, 4 GB, mem)
-m.csr        (0, 5 GB, disk)
-m.key        (0, 4 GB, disk)
-m.date       (0, 3 GB, disk)
-m.length     (0, 3 GB, disk)

MACHINE 520

RESOURCE MANAGER 522

-Memory used:    35 GB
-Memory avail:    30 GB

-Memory total:    65 GB

STORAGE MANAGER 525

-p.csr        (1, 8 GB, mem)
-p.name       (1, 6 GB, mem)
-p.address    (1, 9 GB, mem)
-p.height     (1, 4 GB, mem)
-p.weight     (0, 5 GB, disk)
-p.key        (0, 3 GB, disk)

-m.csr        (0, 6 GB, disk)
-m.key        (0, 3 GB, disk)
-m.title      (0, 4 GB, disk)
-m.date       (0, 2 GB, disk)
-m.length     (0, 3 GB, disk)

*FIG. 6*

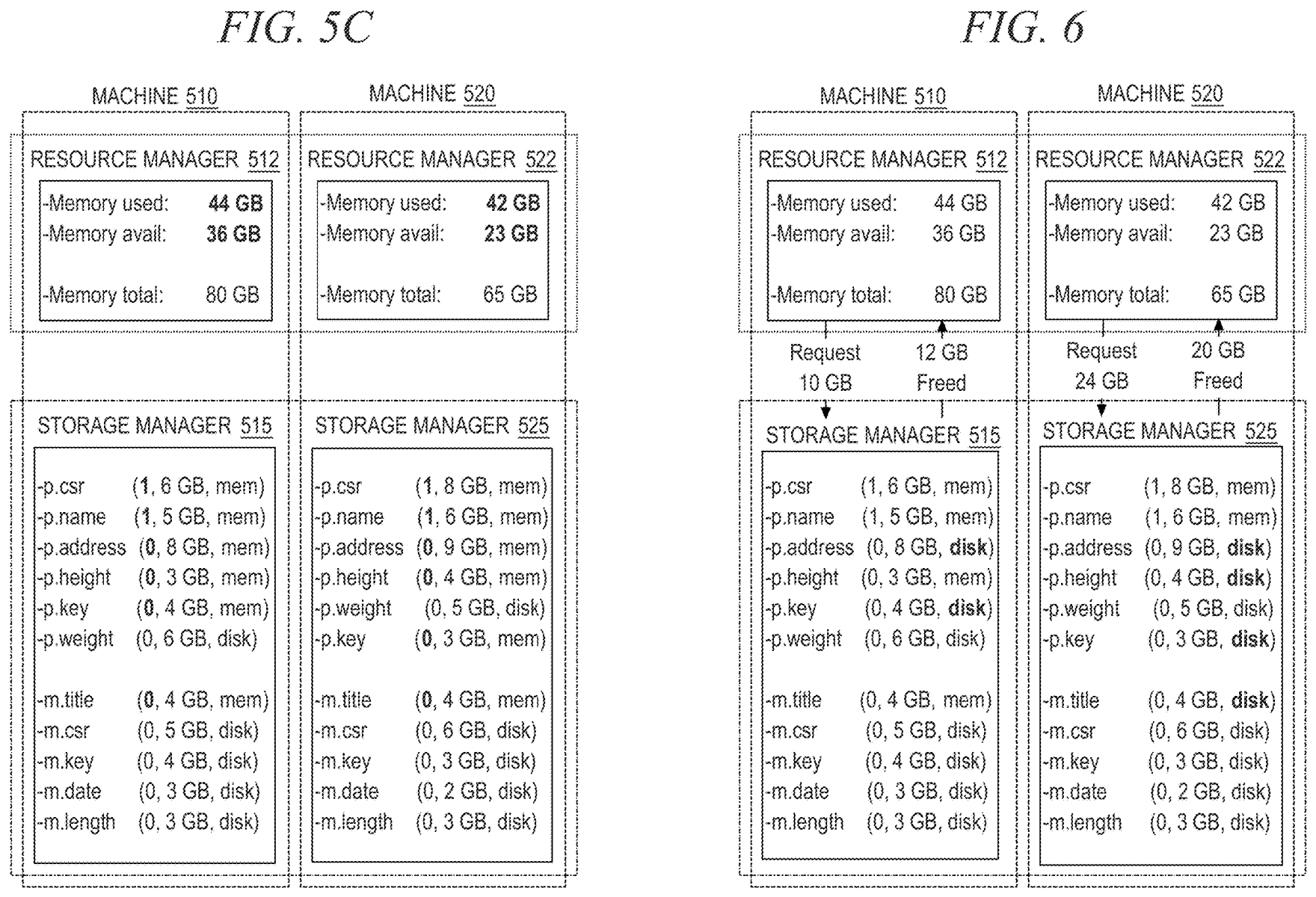

MACHINE 510

RESOURCE MANAGER 512
- Memory used: 44 GB
- Memory avail: 36 GB
- Memory total: 80 GB Request 10 GB → 12 GB Freed STORAGE MANAGER 515
- p.csr (1, 6 GB, mem)
- p.name (1, 5 GB, mem)
- p.address (0, 8 GB, disk)
- p.height (0, 3 GB, mem)
- p.key (0, 4 GB, disk)
- p.weight (0, 6 GB, disk)
- m.title (0, 4 GB, mem)
- m.csr (0, 5 GB, disk)
- m.key (0, 4 GB, disk)
- m.date (0, 3 GB, disk)
- m.length (0, 3 GB, disk)

MACHINE 520

RESOURCE MANAGER 522
- Memory used: 42 GB
- Memory avail: 23 GB
- Memory total: 65 GB Request 24 GB → 20 GB Freed STORAGE MANAGER 525
- p.csr (1, 8 GB, mem)
- p.name (1, 6 GB, mem)
- p.address (0, 9 GB, disk)
- p.height (0, 4 GB, disk)
- p.weight (0, 5 GB, disk)
- p.key (0, 3 GB, disk)
- m.title (0, 4 GB, disk)
- m.csr (0, 6 GB, disk)
- m.key (0, 3 GB, disk)
- m.date (0, 2 GB, disk)
- m.length (0, 3 GB, disk)

*FIG. 5C*

MACHINE 510

RESOURCE MANAGER 512
- Memory used: 44 GB
- Memory avail: 36 GB
- Memory total: 80 GB STORAGE MANAGER 515
- p.csr (1, 6 GB, mem)
- p.name (1, 5 GB, mem)
- p.address (0, 8 GB, mem)
- p.height (0, 3 GB, mem)
- p.key (0, 4 GB, mem)
- p.weight (0, 6 GB, disk)
- m.title (0, 4 GB, mem)
- m.csr (0, 5 GB, disk)
- m.key (0, 4 GB, disk)
- m.date (0, 3 GB, disk)
- m.length (0, 3 GB, disk)

MACHINE 520

RESOURCE MANAGER 522
- Memory used: 42 GB
- Memory avail: 23 GB
- Memory total: 65 GB STORAGE MANAGER 525
- p.csr (1, 8 GB, mem)
- p.name (1, 6 GB, mem)
- p.address (0, 9 GB, mem)
- p.height (0, 4 GB, mem)
- p.weight (0, 5 GB, disk)
- p.key (0, 3 GB, mem)
- m.title (0, 4 GB, mem)
- m.csr (0, 6 GB, disk)
- m.key (0, 3 GB, disk)
- m.date (0, 2 GB, disk)
- m.length (0, 3 GB, disk)

*FIG. 10*

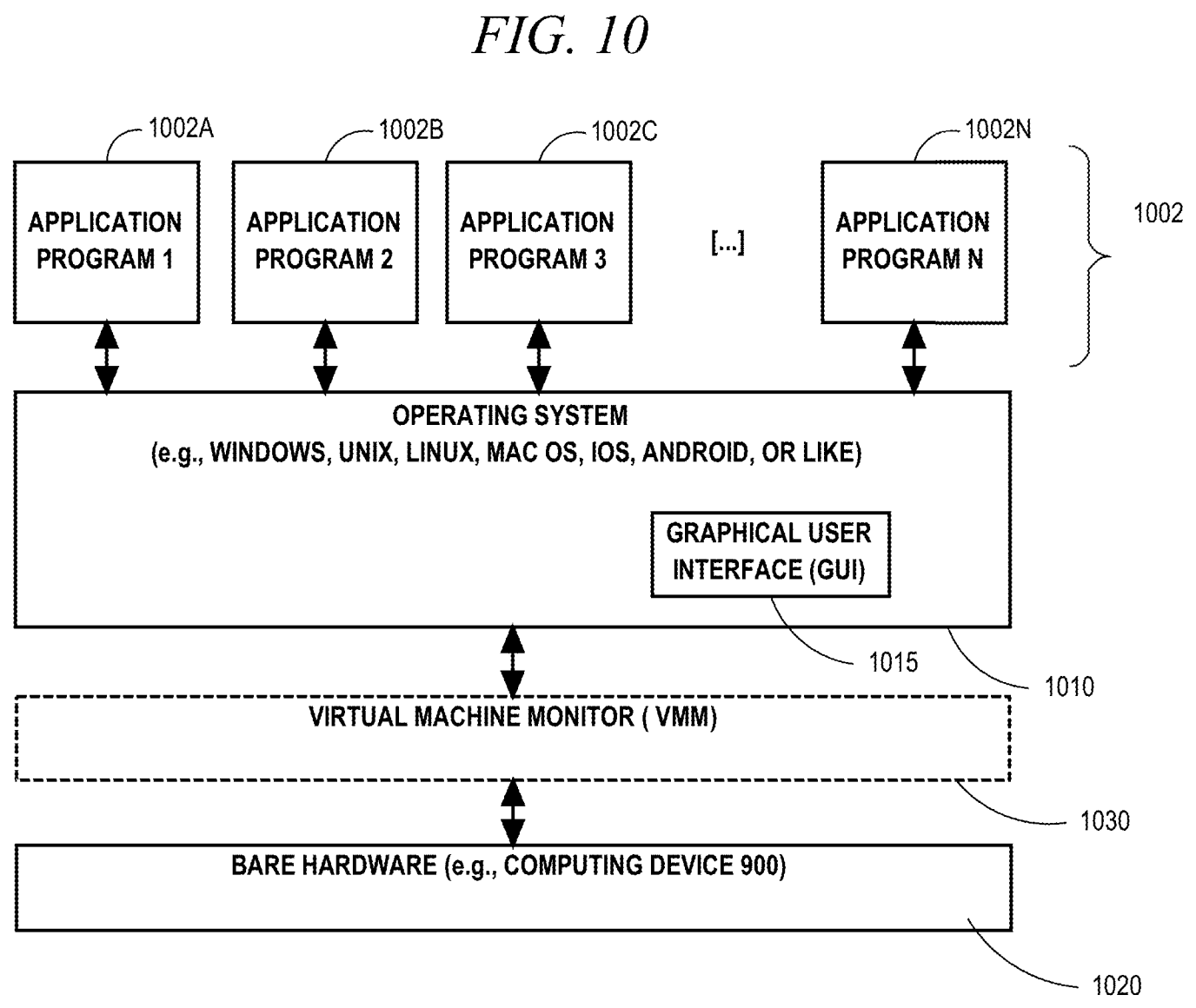

APPLICATION PROGRAM 1    1002A

APPLICATION PROGRAM 2    1002B

APPLICATION PROGRAM 3    1002C

[...]

APPLICATION PROGRAM N    1002N

1002

OPERATING SYSTEM
(e.g., WINDOWS, UNIX, LINUX, MAC OS, IOS, ANDROID, OR LIKE)    1010

GRAPHICAL USER INTERFACE (GUI)    1015

VIRTUAL MACHINE MONITOR ( VMM )    1030

BARE HARDWARE (e.g., COMPUTING DEVICE 900)    1020

OFFLOADING GRAPH COMPONENTS TO PERSISTENT STORAGE FOR REDUCING RESIDENT MEMORY IN DISTRIBUTED GRAPH PROCESSING

CROSS-REFERENCE TO RELATED APPLICATIONS; BENEFIT CLAIM

This application claims the benefit under 35 U.S.C. § 120 as a continuation of U.S. application Ser. No. 18/211,613, filed Jun. 20, 2023, which claims the benefit under 35 U.S.C. § 119 (e) of Provisional Appln. 63/419,826, filed Oct. 27, 2022, the entire contents of which is hereby incorporated by reference as if fully set forth herein.

FIELD OF THE INVENTION

The present invention relates to distributed graph processing engines and, more particularly, to managing in-memory storage of graph components.

BACKGROUND

A graph database is a database that uses graph structures for semantic queries with nodes, edges, and properties to represent and store data. A graph relates data items in the store to a collection of nodes and edges, the edges representing the relationships between the nodes. The relationships allow data in the store to be linked together directly and, in many cases, retrieved with one operation. Graph databases hold the relationships between data as a priority. The underlying storage mechanism of graph databases can vary. Relationships are a first-class citizen in a graph database and can be labeled, directed, or given properties. Some implementations use a relational engine and store the graph data in a table.

Many applications of graph database processing involve processing increasingly large graphs that do not fit in a single machine's memory. Distributed graph processing engines partition the graph among multiple machines and execute graph processing operations in the multiple machines, potentially in parallel, with communication of intermediate results between machines. Distributed graph processing engines can be implemented in cloud environments to provide dynamic scalability as graph sizes increase.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 is a block diagram illustrating functional components for managing and offloading graph components to persistent storage for reducing resident memory in a distributed graph processing system in accordance with an illustrative embodiment.

FIG. 5A illustrates an initial state of a storage manager and a resource manager for an engine running on two heterogeneous machines with a single graph loaded in memory in accordance with an embodiment.

FIG. 5B illustrates a transition from an initial state to an execution state in accordance with an embodiment.

FIG. 5C illustrates a transition from an execution state to a final state in accordance with an embodiment.

FIG. 6 illustrates eviction of graph components from memory in accordance with an embodiment.

FIG. 10 is a block diagram of a basic software system that may be employed for controlling the operation of a computer system in accordance with an embodiment.

DETAILED DESCRIPTION

Figure 1:
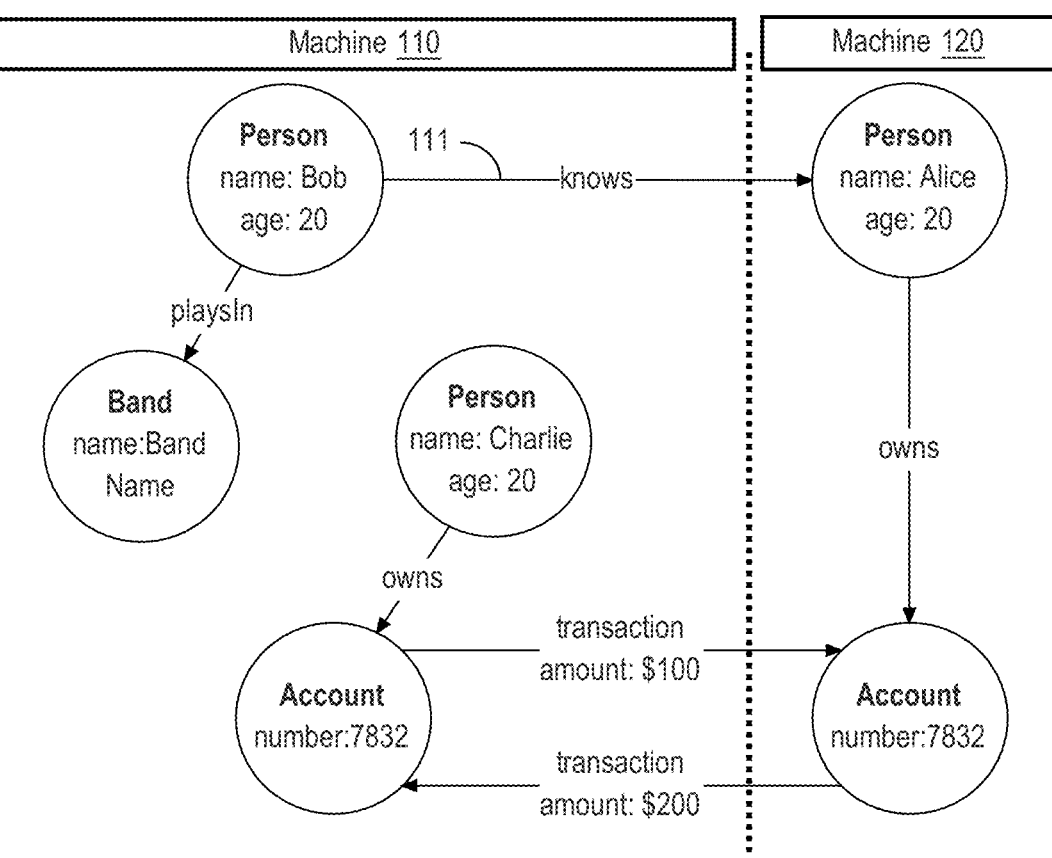
FIG. 1 illustrates an example graph distributed across two machines.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Distributed graph processing engines require large-scale data in memory for performance reasons. However, memory is expensive, especially in cloud environments. The illustrative embodiment described herein provides an approach for reducing memory pressure in distributed in-memory graph processing, with a focus on graph queries, by loading only necessary graph components in memory during user computation. All graph data structures needed for a command execution (e.g., CSR array, array of properties, etc.), as well as data structures created by a command (e.g., query results) are referred to as "graph components" in this disclosure. The approach provided by the illustrative embodiment reduces resident memory consumption without performance loss by efficiently capturing and maintaining only the necessary graph components in memory for the user computations. Unlike traditional relational databases, this approach addresses the nature of graphs, where (i) relationships/edges are materialized in memory, resulting in increased memory consumption, (ii) both forward and reverse edges are typically maintained for performance but are almost never needed at the same time, and (iii) the access patterns and different execution models (e.g., breadth-first traversal and depth-first traversal) call for a tailored approach.

The illustrative embodiment solves the problem of reducing memory pressure on a distributed in-memory graph processing engine for property graphs by evicting unused graph components to a persistent storage, such as an online storage, a shared file system, a local storage, or even to a data management system, and by loading the necessary graph components for a graph processing operation into memory on demand and on time for execution. In one variation, the persistent storage can be local to a machine and does not need to be shared between machines.

In accordance with the illustrative embodiment, a user command, such as a graph query, is executed by a job in the distributed graph engine. A storage manager identifies a set of graph components required to execute a graph processing operation on a graph in a graph processing engine of a database system, reserves an amount of memory needed to load the set of graph components into memory, and loads the set of graph components into memory. In response to a request to free a requested amount of memory, the storage manager evicts one or more unused graph components from memory.

In one variation, the job sends a request to the storage manager that specifies the set of graph components to be loaded into memory for the graph processing operation. In an alternative implementation, the set of graph components is determined based on an execution plan selected for the graph processing operation.

In an implementation, the storage manager stores, for each graph component, metadata comprising a usage counter that indicates a number of jobs that are currently using the graph component, the size of the graph component (e.g. in bytes), and a memory-state indicator that indicates whether the graph component is stored in memory or a persistent storage. If the usage counter for a given graph component has a value of zero, then the given graph component is unused and can be evicted from memory. If the memory-state indicator for a given graph component indicates that the given graph component is stored in the persistent storage, then the given graph component has been evicted from memory.

The illustrative embodiment introduces a storage manager component for distributed graph processing that enables tracking of graph components and reducing memory pressure on an engine by automatically offloading unused graph components to persistent storage with practically no loss in performance during execution, because all needed graph components are loaded into memory in time for execution. Implementations of the storage manager handle efficient and automatic tracking of graph components, managing of each graph component as an independent entity, extraction of graph components used in asynchronous dynamic graph queries with specializations for breadth-first traversals, and eviction of graph components from memory based on cache replacement policies to minimize data transfer between memory and persistent storage.

The variations and implementations of the illustrative embodiment enable the reduction of resident memory without any effective loss of performance due to graph-customized design. The storage manager can support a very diverse set of operations available in distributed graph processing engines using very few and simple concepts. The system can leverage external persistent storage to keep memory usage lower and can provide a higher cost-efficiency ratio compared to a purely in-memory graph processing engine. The tracking of graph components can be performed automatically by the storage manager locally with minimal communication overhead. Furthermore, metadata for graph components collected by the storage manager can be leveraged for cache replacement policies that can minimize the amount of data transferred between memory and persistent storage.

There may be additional latency added to job execution due to having to load graph components into memory before the job can be executed; however, cache replacement policies can ensure that the most important graph components remain in memory, if possible with high probability. Furthermore, the illustrative embodiment enables execution of many queries that would not be possible without the memory efficiency provided by the approaches described herein.

In-Memory Distributed Graph Processing

Graph processing is an important tool for data analytics. Graph processing engines usually tackle a variety of challenging workloads, including graph algorithms (e.g., PageRank) and graph queries, such as "find all persons that know 'Alice'," described in the following query (Query 1):

SELECT id(p1), p1.name
FROM MATCH (p1:person)-[e1:knows]→(p2:person)
WHERE p2.name='Alice'

On the one hand, graph algorithms typically repeatedly iterate over the graphs and often use some data structure abstractions, such as hash maps and priority queues, inherently in their implementations. On the other hand, graph queries match patterns on the graph and further perform traditional relational operations, such as group-by and order-by. Executing graph queries might involve exploring immense amounts of intermediate results and queries can quickly explode in terms of memory usage. Additionally, graph queries exhibit very irregular access patterns with limited locality because query patterns and the connections in the data dictate the accesses. In a distributed system, neither of the two main approaches to graph traversals—(a) breadth-first traversal (BFT) or (b) depth-first traversal (DFT)—are particularly suitable since locality is even more restricted in the distributed setting and graphs tend to be large in size. In distributed systems, graphs are typically partitioned across machines, with a set of vertices, the outgoing edges, and a copy of the incoming edges of those vertices residing in each machine.

FIG. 1 illustrates an example graph distributed across two machines: machine 110 and machine 120. In such a property graph, entities (vertices and edges) can hold properties (e.g., "name," "age" in FIG. 1) and are segregated into one or several vertex tables and edge tables. For example, in the example of FIG. 1, one vertex table for "Person" and one vertex table for "Account" are needed, and one edge table for "transaction" is needed. Vertex or edge tables are typically denoted with vertex and edge labels, respectively. All graph data structures needed for a command execution (e.g., the graph indices and the graph properties), as well as data structures created by a command (e.g., query results) are referred to as "graph components" in this disclosure. Unlike relational representations of graphs, the vertices and edges of an in-memory representation of the graph are stored in in-memory data structures (e.g., compressed sparse row (CSR)) to evaluate graph queries against the graphs. In-memory data structures include, for example, arrays, segmented arrays, and hash tables. Individual elements of in-memory data structures may be referenced for access by, for example, using memory addresses or offsets that may be applied to memory addresses.

Thus, graph components can have dramatically different representations depending on whether they are stored in persistent storage or in memory. For example, vertices and edges can be stored in persistent storage in database tables in a persistent form. Examples of persistent forms are described in U.S. patent application Ser. No. 16/022,465, entitled "Techniques for Enabling and Integrating In-Memory Semi-Structured Data and Text Document Searches with In-Memory Columnar Query Processing", filed on Jun. 28, 2018, by Zhen Hua Liu, et al., the entire contents of which are incorporated herein by reference.

To execute a command against a graph, the pertinent graph components of the graph are loaded from persistent storage into memory. Loading graph components for graph into memory is not merely caching portions of persistent forms of tables, such as a subset of rows of a table or data blocks, but rather involves generating in-memory representations of the graph components. Similarly, in accordance with some implementations, evicting graph components form memory may not merely be storing the graph components back to the database but rather may involve creating a persistent storage of the in-memory representations of the graph components so they may be reloaded into memory quickly.

While the graph data must be efficiently accessible in various ways, algorithms and queries often do not touch the whole graph. For example, PageRank, which is a very commonly used algorithm, touches only forward or reverse graph structures and a single property for representing the PageRank value. Such algorithms can run for a long time and keep the machines occupied while only accessing a fragment of the data. In real graphs, this results in requiring just a percentage of the graph in memory for execution. As another example, queries are highly dependent on the user input and access and/or modify graph components referenced by the queries. For instance, data accessed by a query may have identifying labels. For example, Query 1 above executed on the example graph shown in FIG. 1 only requires the "Person" vertex table and the "knows" edge table in memory, and even from the "Person" vertex table only the "name" property is needed while the "age" property is not. As a further example, for efficient query execution, distributed graph engines typically store each edge in both the source and destination machine to give more flexibility to the query planner. However, very often only one direction is used at a time; therefore, always maintaining in memory edges in both the source and destination machine is inefficient. For the above reasons, it is rare that more than 50% of the graph data is accessed for a given command or graph processing operation.

Additionally, because of the explicit relationship data structures and bidirectional edges, graph processing engines typically use more memory to store the same data as a relational database. Thus, in an in-memory system, a large amount of unused data might be kept in memory over long periods of time, which leads to increased cost, especially in cloud environments, and limits the amount of data that can be processed by the graph processing engine.

A solution for this issue is to take some parts of the data outside of memory (e.g., persistent storage) and to bring it to memory when needed without sacrificing performance. However, due to the arbitrary edge-chasing nature of graph processing, it is very difficult to predict the access patterns of graph processing with small (e.g., memory page) granularity. Therefore, traditional database techniques for gradually bringing data in memory are not a good fit. A more graph-friendly approach is to load into memory the graph components that the graph processing operation requires, especially in distributed graphs that have even lower locality than single-machine graphs. Still, such an approach comes with complexities, i.e., (1) detect which components are required by user computations and efficiently load them into memory to reduce overhead, (ii) reduce the data transfers from persistent storage to memory and vice versa for performance, and (iii) leverage the characteristics of graph processing to enable maximum memory reduction, again without sacrificing performance.

Additionally, a graph processing engine has several ways to iterate over its graph data, which is potentially a vast amount of data, as it needs to efficiently process a large number of algorithms and query executions. For instance, to reduce memory consumption, queries can use a depth-first traversal (DFT) but common algorithms, such as Dijskstra's algorithm, use breadth-first traversal (BFT) pattern. Any solution that aims to reduce memory usage in a graph processing engine must properly handle different execution models.

Offloading Unused Graph Components

Figure 2:
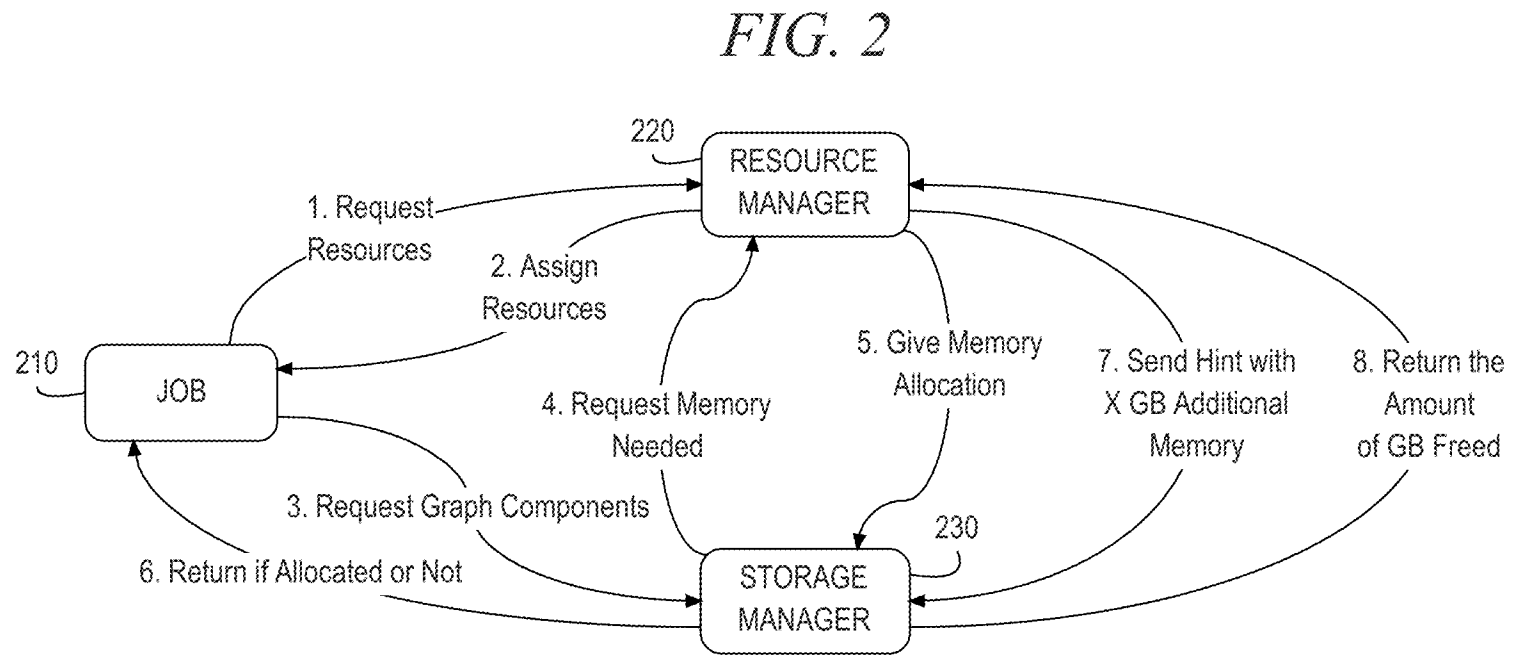

FIG. 2 is a block diagram illustrating functional components for managing and offloading graph components to persistent storage for reducing resident memory in a distributed graph processing system in accordance with an illustrative embodiment. The illustrative embodiment described herein solves the problem of memory pressure in a distributed in-memory graph processing engine for property graphs by evicting unused graph components to a persistent storage such as an online storage (e.g., Oracle Cloud Infrastructure (OCI) object storage), a shared file system (e.g., Hadoop® Distributed File System (HDFS)), a local storage (e.g., Solid State Disk (SSD) or Hard Disk Drive (HDD)), or even a data management system (e.g., Elastic Search). The illustrative embodiment also autonomously loads necessary graph components back into memory on demand and on time for execution. In some variations, the persistent storage can be local to a machine and need not be shared between machines, such as with Network File System (NFS). The approaches encompassed by the illustrative embodiment are applied to distributed graph processing engines with any execution model and can optimize for different execution models, including BFT, DFT, and hybrid BFT/DFT models.

In accordance with the illustrative embodiment, a storage manager component 230 automatically evicting unused graph components from memory to alleviate memory pressure. The storage manager 230 also automatically loads all necessary graph components of the graph into memory for execution of a graph processing operation.

The storage manager 230 tracks parts of the graph referred to herein as "graph components." A graph component stores a specific part of the graph dedicated to a single purpose. For example, graph components include forward and reverse indices, vertex key-mapping, vertex and edge properties, etc. Forward and reverse indices store the incoming or outgoing edges, respectively. Each forward or reverse index has its own graph component. Vertex key-mapping provides bidirectional key mapping between external keys of each vertex and its internal representation in the graph processing engine. This translation is often used by graph processing engines to operate on a controlled and dense key space. Also, each vertex or edge property has its own graph component. Unlike traditional methods that describe storage-to-memory transfers in relational databases, the illustrative embodiment guarantees that all graph computations are fully in memory and that all necessary graph components are in memory by managing the graph components independently.

A user command or graph processing operation, such as a graph query, is executed by a job 210 in the distributed graph engine. Jobs request memory from a resource manager or any component responsible for allocating and keeping track of memory in the distributed graph processing system. Any memory allocation is performed using a resource manager component 220. For example, a job that loads a graph reserves memory based on expected requirements. If insufficient memory is available at allocation time, a request to extend the memory reservation of the job is submitted to the resource manager 220. At the end of execution, jobs release the memory that is no longer needed and commit the amount of memory that outlives the job (e.g., persistent objects such as graphs that the job created, modified, or destroyed). Also, graph components can be serialized and deserialized efficiently.

The storage manager 230 uses a model to track graph components of a graph and evicts graph components from memory to persistent storage to reduce the memory footprint for graph processing while ensuring consistent memory state during execution. In one implementation, a job 210 requests from a resource manager 220 on each machine the resources needed to execute the job. Subsequently, the storage manager 230 of each machine identifies the graph components required to be in memory for execution of the job 210 on that machine. In one implementation, the job 210 sends a request to the storage manager 230 to load a specified set of graph components for execution of a graph processing operation. In other implementations, identification of the required graph components can be automated. The job 210 blocks execution until the storage manager confirms that all required graph components are loaded into memory.

The storage manager 230 keeps track of all existing graph components across machines. Upon request, the storage manager 230 iterates over the graph components and evaluates which are in memory and which are on persistent storage. Based on this determination, the storage manager calculates the amount of memory required to load all needed graph components to execute the job. The storage manager then requests the required amount of memory from the resource manager to load the remaining graph components. The resource manager 220 then assigns the resources to the storage manager 230 if available.

If the resource manager 220 lacks resources, it can send a hint to the storage manager 230, which then frees memory by evicting unused graph components. In some embodiments, the storage manager evicts unused graph components based on a predefined cache replacement policy. Note that the amount of memory that is freed by the storage manager potentially can be lower than the amount of memory requested by the resource manager 220 if there are not sufficiently used graph components available. If this is the case, the storage manager 230 will, depending on the configuration, either free as much memory as possible and return the amount of the released memory to the resource manager or leave the graph components in memory and notify the resource manager that the requested amount of memory could not be freed. The resource manager can then fall back to alternative failure mechanisms (e.g., the job can be canceled or put on hold). Alternatively, the storage manager 230 can run as an independently configured component that can trigger eviction autonomously.

Once the memory required to load the graph components is assigned to the storage manager 230, the storage manager loads the remaining needed graph components from persistent storage to memory and marks them as being used. The storage manager then notifies the job 210, which can then start execution.

The storage manager 230 enables execution of jobs on bigger graphs and analysis of several graphs concurrently with less memory required, which otherwise might not have had enough memory to execute. Altogether, the storage manager of the illustrative embodiment is able to track any graph component and ensure correct running state for any kind of job. It ensures that any graph components needed to run a job are in memory. It further ensures that data in memory is in a consistent state. Thus, the job 210 is able to analyze larger queries on fewer machines, which also reduces the required communication between machines.

The storage manager 230 only evicts graph components to persistent storage when facing memory pressure and can be configured with any required notion of memory pressure. In the case that the memory available to the system allows the storage manager to keep all graph components in memory, then the storage manager will stay idle, and no performance overhead from evicting/reloading will occur. Additionally, in the case that there is memory pressure but all graph components needed for a command are already in memory, the storage manager 230 will not incur additional overhead.

Even when graph components required to be brought back into memory, the illustrative embodiment ensures that the performance overhead is minimal. Modern SSDs have a typical read/write bandwidth of tens of gigabytes per second. Coupled with efficient serialization and deserialization methods for the graph components, the illustrative embodiment adds only minor performance overhead. Furthermore, the loading of several graph components is inherently parallel (as every graph component is independent), which further improves performance.

In some embodiments, the storage manager may have to make choices when it comes to evicting graph components. In practice, at a given time, several graph components from different graphs can be evicted. Several replacement policies, such as Least Recently Used or Least Frequently Used can be implemented.

The most common usage pattern of the storage manager is that before a command runs, all the required graph components are ensured to be in memory, and when the job completes, those graph components can be evicted if further memory is needed; otherwise, the unused graph components can be cached. For some jobs, such as queries using a BFT pattern, graph components can be loaded and evicted during query execution without impacting performance of the execution or its complexity.

Graph Structure

The illustrative embodiment can be used with graphs stored in compressed sparse row (CSR) representation, but the approaches described here can be easily generalized for other graph structures, such as adjacency lists. The concepts described herein are not specific to this system, and other systems for storing and representing graphs can be used within the spirit and scope of the illustrative embodiment.

Figure 3:
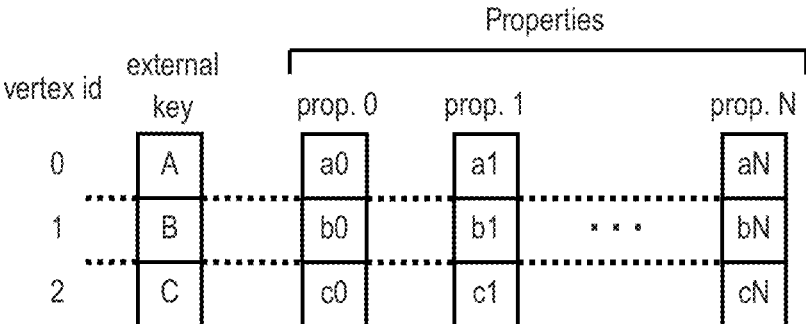
FIG. 3 depicts an example of a vertex table in accordance with an embodiment.

Vertices are stored in vertex tables. A vertex table stores the unique external key of the vertices, which is used by the user to refer to each vertex, and the properties in arrays. There is one array per property, each with one entry per vertex. FIG. 3 depicts an example of a vertex table in accordance with an embodiment. Here, the vertex ID is used internally to reference a vertex, while the external vertex key is used by the user to reference a vertex. Both are unique.

Vertices are distributed such that each machine holds approximately the same number of vertices for each degree. All vertices are owned and stored by a single machine, called the data owner.

Figure 4:
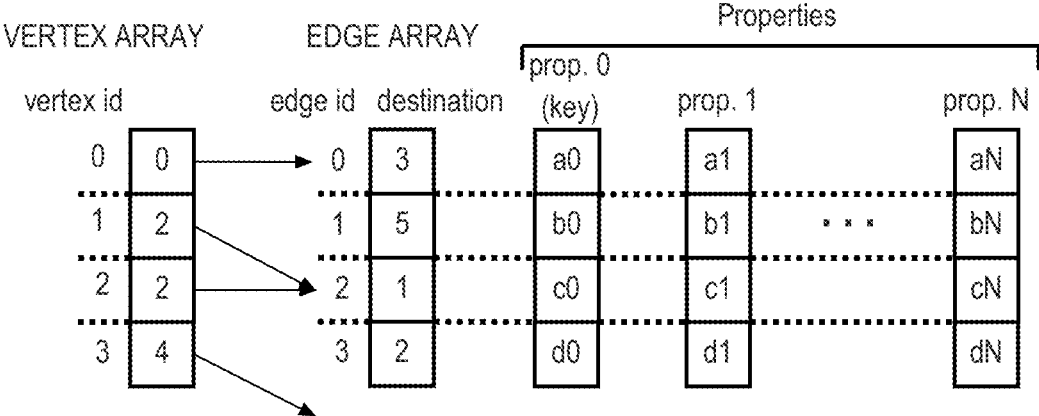
FIG. 4 depicts an example of a compressed sparse row representation with properties in accordance with an embodiment.

Edges are stored in a compressed sparse row (CSR) format on the data owner machine of the source. Edge properties are stored alongside the edges in columns. FIG. 4 depicts an example of a compressed sparse row representation with properties in accordance with an embodiment. For a given edge table, all the edges have their sources in a single vertex table and their destinations in a (potentially different) single vertex table.

For several applications, it is useful to be able to navigate the edges in the reverse direction (e.g., finding all vertices with an edge to a given vertex). Therefore, the system also stores a reverse CSR with all the edges duplicated in the reverse direction (reverse edges can bring significant performance benefits but can of course be disabled to save memory). Note that the forward edge and its reverse version are different machines due to the distributed aspect if and only if the source and destination are on different machines, such as with edge 111 in FIG. 1 where a forward edge would be stored in machine 110 or a reverse edge would be stored in machine 120.

Internally, tables are stored in two separate arrays of tables. One array is used to store the edge tables and another is used to store the vertex tables. Each table has a table ID, which corresponds to the index in the respective table array. To ensure efficient access, entities are not referred by their keys but by an internal ID: vertex_id and edge_id. The internal ID is a 64-bit value composed of the machine ID, the table ID, and the local ID (local_id). The local_id corresponds to the index of the entity in its table on its machine, so it is continuous.

The internal ID is not visible by the client, who instead uses the key to refer to an entity. The key is called external_key for disambiguation. The graph also stores a dictionary that maps the external vertex keys to the tuple {machine ID, vertex table ID, vertex index}. The machine that stores the dictionary entry for a vertex is given by a hash function applied to the key. This machine is the hash owner of the vertex. Note that vertex 3 does not exist, but the entry is present in the CSR as sentinel.

General Approach

Consider an example to clarify the approach of the illustrative embodiment. Note that while the following example scenario uses a query for visualization, the method can be used for any graph analytics job, query, or algorithm and can be applied to any execution model. Consider the following query (Query 2):

SELECT p.name, id(p)
    FROM    MATCH    (p:person)-[e1:likes]→(m1:movie),
        MATCH (p)-[e2:likes]→(m2:movie)
    WHERE m1.title='Star Wars'
    AND m2.title='Avatar'

The graph components needed to execute the job are extracted and sent to the storage manager 230, which in this case are: {p.csr_forward, p.key, p.name, m.title}, assuming that the execution order is p→m1→m2. In this case, the query planner would choose a different order, such as m1→p→m2, both the reverse and the forward person-movie CSR indices would be required.

FIG. 5A illustrates an initial state of a storage manager and a resource manager for an engine running on two heterogeneous machines (i.e., machines with a different amount of memory) with a single graph loaded in memory in accordance with an embodiment. Each machine (machine 510, machine 520) has a local resource manager 512, 522 that keeps track of the available local resources and a local storage manager instance 515, 525 that keeps track of all local graph components. As shown in FIG. 5A, the storage manager stores metadata for each graph component, including the name of the graph component (e.g., "p.csr"), a usage_counter value (e.g., 1 for p.csr), a size of the graph component (e.g., 6 GB), and a memory_state value indicating whether the graph component is in memory or persistent storage (e.g., "mem" for p.csr).

When receiving a request by the job, each storage manager instance 515, 525 iterates over the requested graph components and calculates the amount of memory needed to load it into memory and marks them as being used by increasing a "usage_counter" for each requested component to prohibit it from being evicted from memory while being accessed/requested. The "usage_counter" corresponds to the first number per component in the storage manager. Further, as is visible in the initial state shown in FIG. 5A, the storage manager 515 on machine 510 has all graph components already in memory, except for the "p.key" and "m.title" graph component and, hence, needs an additional 4 GB of memory to load the graph components. Similarly, the storage manager 525 on machine 520 needs 7 GB of memory to load the remaining graph components, in this case "p.key" and "m.title," into memory.

Each storage manager 515, 525 then requests the amount of memory from the local resource manager instance 512, 522 with the job being the owner of the assigned resources need to load the graph components into memory. Further, the job requires 40 GB of additional memory (20 GB per machine) for the job execution, which the job directly reserves from the resource manager 512, 522. Once the memory is reserved, the storage manager 515, 525 loads the graph components from persistent storage. FIG. 5B illustrates a transition from an initial state to an execution state in accordance with an embodiment. As seen in FIG. 5B, the usage counters for "p.csr," "p.name," "p.key," and "m.title" are incremented in storage managers 515, 525. Also, the memory used is increased and the memory available is decreased in the resource managers 512, 522. The job is then notified that the graph components are in memory and that the job can resume execution.

Once the job is finished, the job releases the resources, and the storage manager 515, 525 decreases the usage counter of the graph components that were used by the job. FIG. 5C illustrates a transition from an execution state to a final state in accordance with an embodiment. As seen in FIG. 5C, the usage counters for "p.csr," "p.name," "p.key," and "m.title" are decremented in storage managers 515, 525. Also, the memory used is decreased and the memory available is increased in the resource managers 512, 522. While the memory required to run the job is freed (e.g., 20 GB per machine), it might not be desirable to free the unused graph components immediately. Instead, in accordance with one implementation, the storage manager may keep the graph components in memory until additional resources are requested by the resource manager. However, to enable the engine to free memory quicker when memory pressure arises, graph components that were altered during the job execution can be written to persistent storage asynchronously by a background thread. This method ensures an all-or-nothing semantic that enables a guarantee that all the graph components needed for a job are in memory during execution independent of the execution model.

Automating the General Approach:

Alternatively, a "first-touch" loading approach can be used, which could enable using the storage manager out of the box for any system and algorithm. However, this has several drawbacks, such as performance penalties for ensuring that graph components are in memory upon every access to the data (which might be especially grave for algorithms that apply many iterations over the same data) and the lack of an all-or-nothing semantic, which could lead to data being loaded into memory only to fall out of memory when loading another touched component, i.e., a job could be started that does not have the capacity to have everything in memory.

Specialization for Query Execution Models
Detection of Graph Components in Queries:

In some implementations, upon receiving a job, the graph components required to execute the job are detected. The goal is to load the minimal upper bound of the graph components that could be needed during a job execution. Property graph query language (PGQL) queries are first translated into a general query plan. The query plan is then transformed into a distributed query plan, which then handles specifics about querying a distributed graph. Finally, the distributed plan is converted into an execution plan that consists of stages and transitions between them. All stages and transitions have highly structured and well-defined inputs/outputs/constraints. Since the inputs are well-defined, all required graph components can be extracted from the execution plan to load them into memory before running a query.

Consider the following query (Query 3):
SELECT MAX (DISTINCT (v2.vprop2+v2.vprop3)/2)
FROM MATCH (v1:vlabel1)-[e1:elabel1|elabel2]→(v2: vlabel2)
WHERE id(v1)<100 AND v1.vprop2>v2.vprop1
GROUP BY v1.vprop2% 2

A single stage is responsible for matching a single vertex and a single transition is responsible for matching a single edge. In the example Query 3, there are two stages (stage 1 matching vertex v1 and stage 2 matching vertex v2) and a single transition (transition 1 matching edge e1). By default, if no vertex or edge labels are present, the whole CSR of the graph is required. If some labels are present, providers having those labels are required. In this example, the edge requires providers vlabel1, elabel1, elabel2, and vlabel2. When the execution is performed in a DFS-based way, all providers are required at the beginning of the execution. Every execution stage contains information about which edge and vertex providers are needed for the matching.

Other graph components needed during the execution are properties. Properties are accessed during filter evaluation and property selection (e.g., v2.prop3 above). Filters can be found in the WHERE clause of the query. From the engine point of view, filters are trees (a forest) of expressions that get evaluated on each match. From the expression tree, the engine has interest in only the tree nodes that represent a property value reading. Other tree nodes do not require any additional information. In order to get the required property reading information, the engine must traverse the expression tree, find the property reading node, and extract the required information from it. The node contains a property id (prop_id) that can be used for requesting the properties.

Optimization for BFT Execution:

Breadth-first traversal (BFT) is the most common runtime technique used in many engines, e.g., Apache Spark™ Graph Frames and the Neo4j® graph data platform. BFT expands horizontally and has several benefits for graph querying, such as being very simple to implement and easy to parallelize. After every stage, the working set of intermediate results can be split and allocated to a different worker performing the computation since they are independent of each other. Furthermore, it can take advantage of any locality in the graph and the way the graph is stored in memory. For example, it is common that the edges of the same source vertex are stored continuously in memory; hence, with BFT these edges are accessed consecutively. For queries, the horizontal stage-by-stage expansion can be exploited by the storage manager.

For instance, consider the following graph query (Query 4):
-- Calculates the number of movies that a person likes per country
SELECT pe.name, co.name, COUNT(*)
FROM MATCH (pe:person)-[:likes]→(:movie)-[:recorded_in]→(:city)-[:belongs to]→(co:country)
GROUP BY pe, co When matching this example query with BFT, the execution is performed as follows:
Match "person" vertices, creating what is called the frontier in BFT terminology, i.e., the set of vertices that feed the next iteration.
Match "likes" edges.
Match "movie" vertices.
Match "recorded_in" edges.
Match "city" vertices.
Match "belongs_to" edges.
Match "country" vertices and produce the result that GROUP BY executes.

Due to this stagewise execution, it suffices to have only the graph components for each vertex-and-edge matching stage in memory. This means that once stages 1 and 2 are completed and the "movie" vertices are found, every component from "person" and "likes" tables can be removed from memory. In accordance with the illustrative embodiment, the storage manager can decrement the usage_counter associated with these tables at this time. Such memory optimizations can significantly reduce memory, especially for larger queries that access several components of the graph.

Optimization for DFT Execution:

Depth-first traversal (DFT) or hybrid BFT/DFT traversals enable potentially lower runtime memory consumption for intermediate results during graph querying, because they allow for eager completion of intermediate result to final. Unlike BFT-only execution, DFT or BFT/DFT execution keep all parts of the graph query active at the same time; therefore, the storage manager must maintain all parts active in memory. In the above example of Query 4, this means that pattern matching flows from "person" vertices all the way to "country" vertices before producing results for GROUP BY. However, this style of execution typically completes the query execution incrementally, e.g., although results flow down, at some point during execution all "person" vertices are processed, enabling the storage manager to possible remove the data of these completed parts form memory.

Component Eviction Upon Memory Pressure

When the resource manager needs additional resources, it can ask the storage manager to free up some memory by evicting graph components. FIG. 6 illustrates eviction of graph components from memory in accordance with an embodiment. In the depicted example, resource manager 512 requests 10 GB of memory be freed, and resource manager 522 requests 24 GB be freed. The storage manager 515, 525 then attempts to free the amount of memory by asynchronously evicting unused graph components. In one implementation, the storage manager can use a cache replacement policy for evicting the graph components. In some variations, since the released memory is tracked by the resource manager 512, 522, the resource manager can notice the freed memory without being explicitly notified.

When the storage manager is unable to free the amount of memory requested by the resource manager, as with storage manager 525 in FIG. 6, the system can behave in a variety of ways depending on the configuration. For example, the storage manager 525 can attempt to free as much memory as possible to alleviate memory pressure. Alternatively, the storage manager 525 can behave more conservatively and keep the graph components in memory.

Note that the storage manager can alternatively function as an independently configured component that operates with a fixed or dynamic maximum amount of memory. In the case that some memory threshold is surpassed, the storage manager can trigger eviction autonomously to prevent memory pressure from arising. Analogously, the storage manager can bring graph components back into memory if memory usage is low to ensure fast query execution when a job is initiated.

Concurrency

Synchronous Loading/Offloading:

Graph components can be loaded and offloaded synchronously to avoid concurrency issues. When a thread attempts to request components, it locks the storage manager until the metadata is updated and the graph components are in memory. Other incoming threads must wait until previous threads finish their calls to the storage manager by queuing on the lock. This does not lead to much additional overhead, because the waiting thread is not able to make progress without accessing the graph components.

Asynchronous Loading/Offloading:

Graph components are independent of each other and, hence, can be serialized/deserialized independently and in parallel. Thus, blocking the storage manager while loading a large graph component is too restrictive and inefficient. Some embodiments implement a procedure to enable asynchronous loading and offloading of graph components.

When a thread attempts to offload a graph component, it proceeds as follows:

Lock the storage manager.

Mark the graph component as being offloaded by atomically setting the memory_state of the graph component to offloading_in_progress.

Release the lock.

Start the offloading.

Once offloading is complete, mark the graph component as "on_disk."

If another thread attempts to access the graph component that is being offloaded in the meantime, the thread performs the following:

Lock the storage manager.

See that the needed graph component is being offloaded.

Raise a special flag monitored by the offloading thread to indicate that the graph component being offloaded is requested. This could be done by setting the memory_state flag of the graph component to "offloading_canceled."

Release the lock and wait until offloading is done to request the needed graph component.

The offloading thread monitors the special flag. If it is raised, the offloading thread can cancel the offloading, lock the storage manager, and mark the graph component as in memory. The waiting is achieved by regular polling on the graph component to check if the graph component is still being offloaded. Once the graph component is marked as in memory or on disk, the other thread again requires a lock on the storage manager to request the graph component.

Analogously, when a thread tries to load a graph component, it proceeds as follows:

Lock the storage manager.

Mark the graph component as being loaded by atomically setting the memory_state of the graph component to "loading."

Release the lock.

Start the loading of the graph component.

Once loading is completed, mark the graph component as "in_memory."

Similarly, if a thread tries to access a graph component that is being loaded:

Lock the storage manager.

See that the needed graph component is being loaded.

Release the lock and wait until the loading is done to request the needed graph component.

Again, the waiting is achieved by regular polling on the graph component to determine whether the graph component is still being loaded. Once the graph component is in memory, the thread requires a lock on the storage manager to request the graph component.

Since data is not written to persistent storage by default during graph loading, in accordance with one implementation, there is a background thread that writes graph components to persistent storage (e.g., disk) even when they are not being offloaded. This ensures fast memory eviction upon memory pressure.

Data Coherence

To avoid computational overhead, it is beneficial to avoid serialization of every graph component before eviction if there is already an up-to-date copy of the graph component in persistent storage. Whether data can be modified depends deterministically on the job; therefore, it can be determined in advance whether a graph component is accessed by a job solely to be read or to be modified as well. In some implementations, if a graph component can be modified by a job, then the storage manager can mark the graph component as dirty. While the job might not end up modifying the graph component, the storage manager does not necessarily track individual modifications of graph components; therefore, the graph components marked as dirty will be written back to persistent storage anyway. When dirty graph components are evicted from memory, they have to be serialized to persistent storage to ensure that changes to the graph component are not lost. Otherwise, data transfers can be reduced by writing only "clean" graph components to external storage if they have not been serialized before.

Metadata for Storage Manager

The storage manager stores metadata to function properly. The metadata is used to keep track of the following things:

in_use_count: Amount of jobs currently using the graph component.

type: Type of graph component. Some graph components might be more costly to serialize/deserialize than others.

size: Size of the memory component.

memory_state: Memory state, i.e., if it is in memory, on disk, or potentially in another memory level.

was_modified: Whether the graph component was modified. Graph components that have not been modified can simply be freed, and there is no writing to external storage necessary.

has_copy: Whether there already exists a copy on external storage. Since data is not written to persistent storage by default during graph loading, there might be graph components that do not have a copy on persistent storage (this could be combined with the was_modified handle).

Some additional metadata used by cache replacement policies, e.g., how often a graph component was used in total.

In accordance with one implementation, a data structure for graph component metadata may be as follows:

```
struct data_component_metadata {
    data_component_id identifier;
    std::atomic<size_t> in_use_count;
    size_t size;
    enum {IN_MEMORY, ON_DISK, LOADING, OFF-
        LOADING_IN_PROGRESS,
        OFFLOADING_CANCELLED} memory_state;
    bool was_modified;
    bool has_copy;
    // additional metadata
}
```

Communication Between Job and Storage Manager

In some implementations, each job instance on each machine contacts the storage manager on its machine separately with the job_id and the list of needed graph components. This has the benefit that no synchronization between the machines is necessary. Also, the storage manager on each machine can operate independently of the other instances. However, for each machine, the list of graph components must be computed separately, which can lead to additional overhead.

Enforcing Cache Replacement Policies Efficiently

To ensure that the cache replacement policies can be performed quickly and efficiently, some implementations provide a fast way to iterate over all graph components in an efficient manner in the order specified by a cache replacement policy. Graph component IDs and their metadata are stored in an unordered way. When memory is requested by the resource manager, the storage manager iterates over the graph components, extracts the ID and the metadata from those that can be evicted from memory, and sorts graph components by the order defined in the cache replacement policy. Thus, the storage manager does not need to keep the graph components in order. It is probable that the number of graph components is reasonable and, thus, the graph components can be sorted with a reasonable overhead.

To further provide a fast mechanism to release memory, the storage manager can prioritize graph components that do not need to be written back to persistent storage.

Potential cache replacement policies include least recently used and least frequently used.

Security

In some implementations, at startup, each machine will randomly create an encryption key. Each machine will also create a temporary folder (with a randomized name) in the path supplied in the configuration. Every file written will be encrypted with the (per-machine) key and decrypted with the same key when read back. The encryption algorithm will be parameterizable in the configuration. Encryption could be disabled by the administrator but would be enabled by default. This could be useful for attached object stores that have a built-in per-user encryption, for example. The system will also leverage the authentication mechanisms provided by the encryption algorithms to make sure that the data was not altered on external storage.

In some implementations, files are deleted when the graphs get destroyed (potentially at the end of the process). Files could remain if the graph engine crashes. However, in the latter case, the files will be completely unusable by anyone as they are encrypted with a key that is unrecoverable (even when the engine starts again in the future on the same machine).

Procedural Overview

Figure 7:
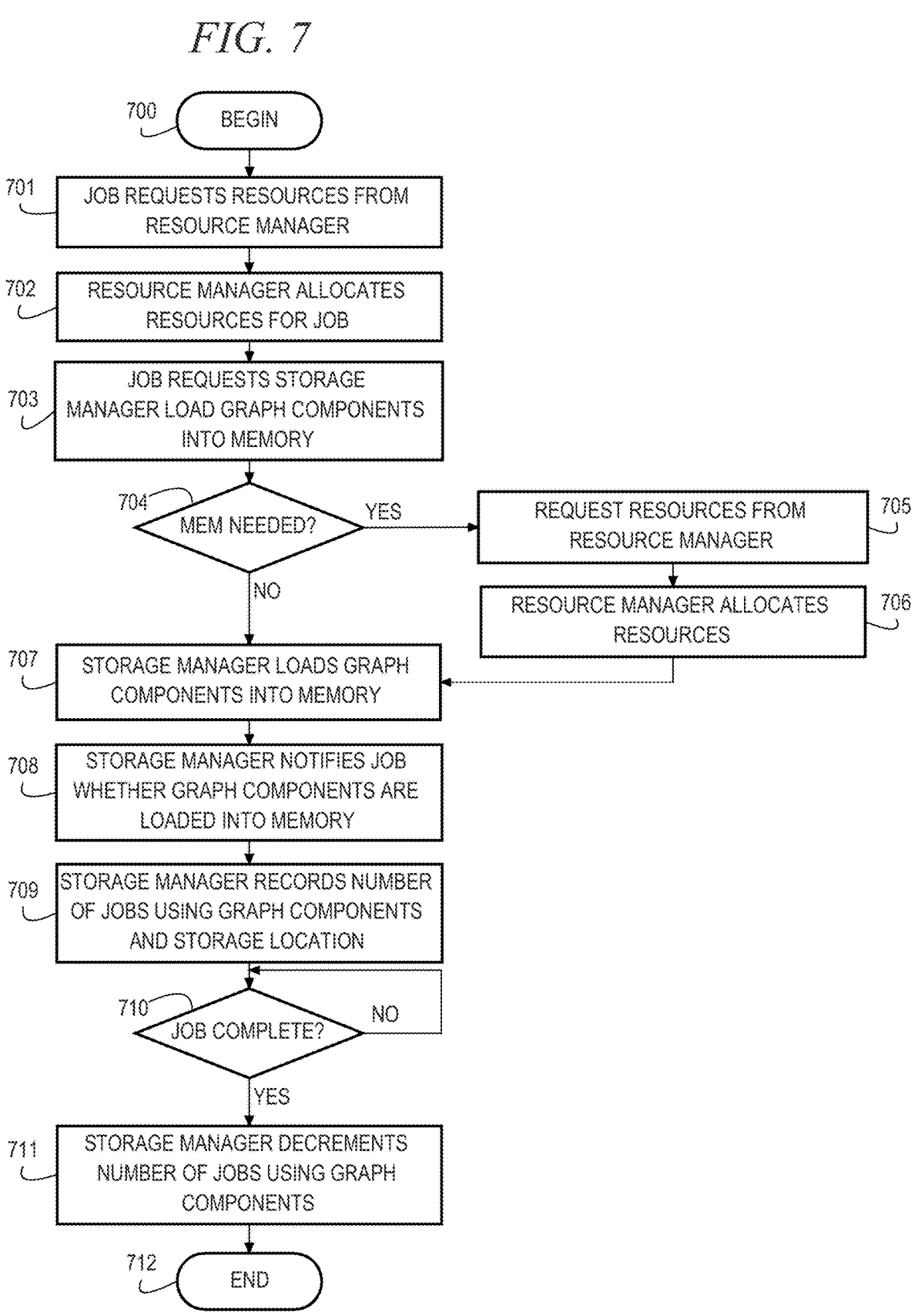
FIG. 7 is a flowchart illustrating operation of loading data objects required by a job in accordance with an embodiment.

FIG. 7 is a flowchart illustrating operation of loading data objects required by a job in accordance with an embodiment. Operation begins (block 700), and the job requests resources form the resource manager (block 701). The resource manager allocates resources for the job (block 702). The job requests the storage manager to load data objects required for the job into memory (block 703). If the storage manager determines that memory is needed to load the data objects into memory (block 704). This determination may be made, for example, based on whether the required graph components are already in memory or must be loaded from persistent storage.

If memory is needed (block 704:YES), then the storage manager requests resources from the resource manager (block 705), and the resource manager allocates resources to the storage manager (block 706). Thereafter, or if memory is not needed (block 704:NO), the storage manager loads the graph components into memory (block 707). The storage manager notifies the job whether the graph components are loaded into memory (block 708). The storage manager records the number of jobs using the graph components and the storage location (block 709). The storage location may indicate, for example, whether a given graph component is in memory or disk (persistent storage).

The storage manager determines whether the job is complete (block 710). In an implementation, the job notifies the storage manager when the job completes, for example. If the job is not complete (block 710:NO), then operation returns to block 710 until the job completes. If the job is complete (block 710:YES), then the storage manager decrements the number of jobs using the graph components (block 711). Thereafter, operation ends (block 712).

Figure 8:
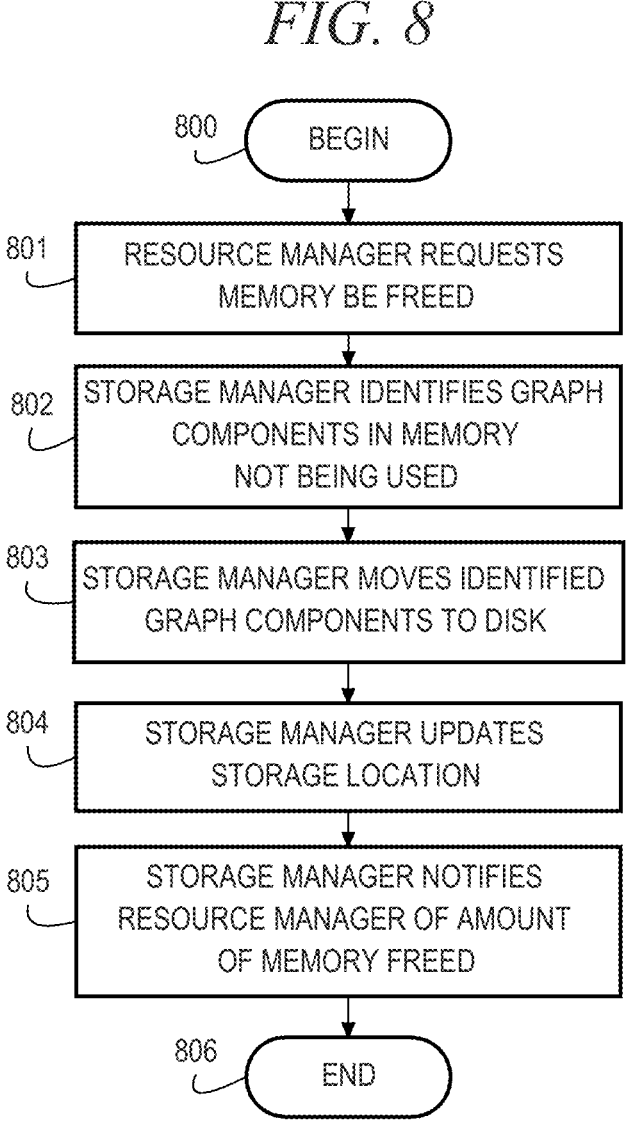
FIG. 8 is a flowchart illustrating operation of evicting graph components from memory in accordance with an embodiment.

FIG. 8 is a flowchart illustrating operation of evicting graph components from memory in accordance with an embodiment. Operation begins (block 800), and the resource manager requests memory to be freed (block 801). In some implementations, the resource manager requests memory to be freed in response to memory pressure due to a job using more resources than requested, such as by storing intermediate results, or due to another job requesting resources. The storage manager identified graph components in memory that are not currently being used by a job (block 802). The storage manager moves the identified graph components to disk (persistent storage) (block 803) and updates the storage location (block 804). The storage manager then notifies the resource manager of the amount of memory freed (block 805). Thereafter, operation ends (block 806).

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
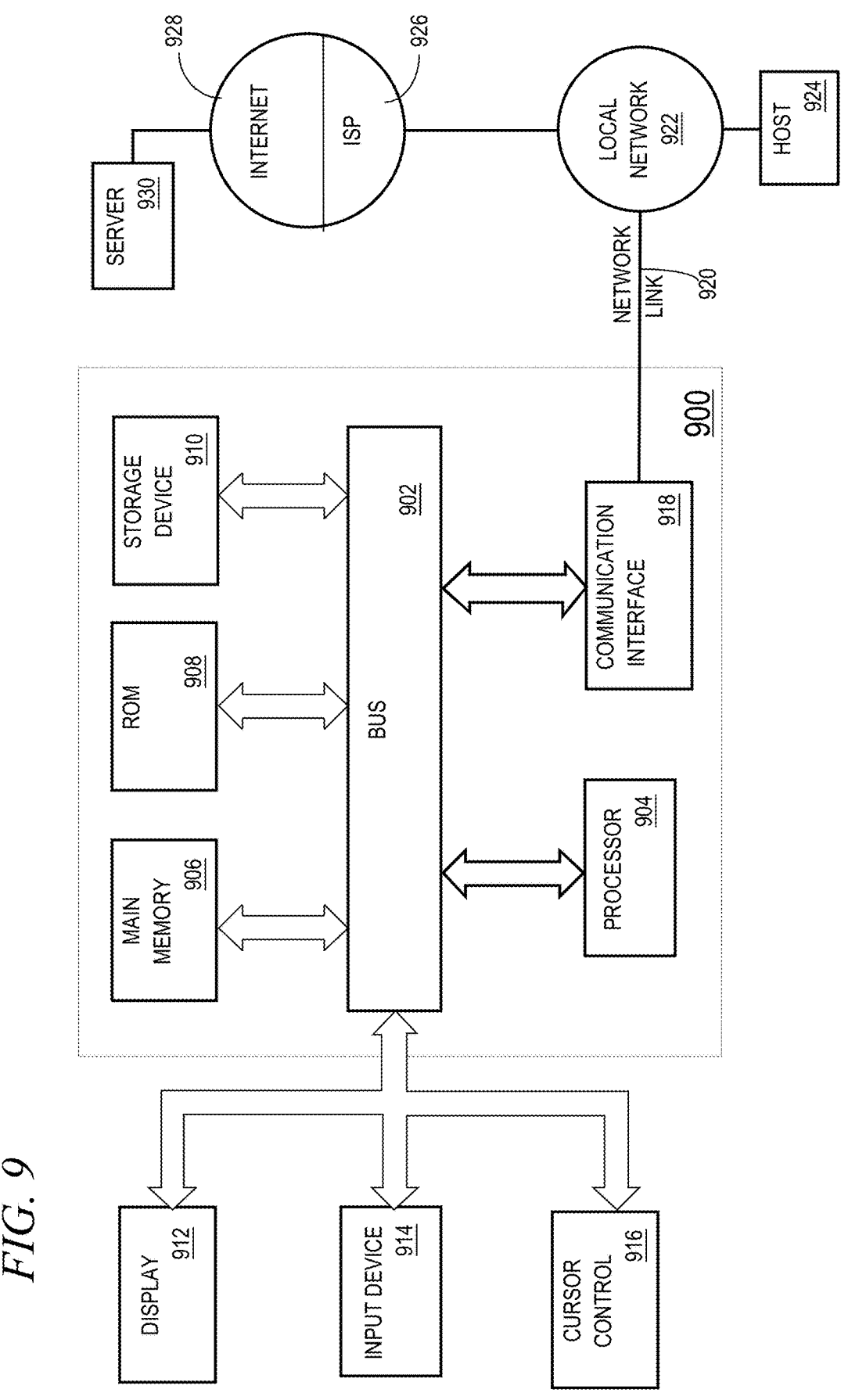
FIG. 9 is a block diagram that illustrates a computer system upon which aspects of the illustrative embodiment may be implemented.

For example, FIG. 9 is a block diagram that illustrates a computer system 900 upon which aspects of the illustrative embodiment may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction.

In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as valid data types and to be processed by a DBMS in database statements. In general, database software of a DBMS is programmed to recognize and process native data types without configuring the DBMS to do so by, for example, defining a data type by issuing DDL statements to the DBMS.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   maintaining metadata for a plurality of graph components, wherein the metadata comprises, for each given graph component, a memory-state indicator that indicates whether the given graph component is stored in memory;
   identifying a set of graph components required to execute a graph processing operation on a graph by a job in a graph processing engine of a database system;
   identifying, based on the metadata, a first subset of the set of graph components that are stored in the memory and a second subset of the set of graph components that are not stored in the memory;
   determining an amount of memory needed to load the second subset of graph components into the memory;
   reserving an amount of memory needed to load the second subset of graph components into the memory;
   loading the second subset of graph components into the memory; and
   initiating execution of the graph processing operation using the set of graph components in the memory,
   wherein the method is performed by one or more computing devices.

2. The method of claim 1, wherein identifying the set of graph components comprises receiving a request from the job that specifies the set of graph components to be loaded into the memory.

3. The method of claim 1, wherein identifying the set of graph components comprises determining the set of graph components based on an execution plan selected for the graph processing operation.

4. The method of claim 1, wherein:

a resource manager assigns an amount of memory needed to execute the graph processing operation;

reserving the amount of memory needed to load the second subset of graph components into the memory comprises requesting, from the resource manager, the amount of memory needed to load the second subset of graph components into the memory; and the resource manager assigns the amount of memory needed to load the second subset of graph components into the memory from the amount of memory assigned for the graph processing operation.

5. The method of claim 1, wherein the metadata further comprises:

a size of the graph component, and a usage counter indicating a number of jobs that are currently using the graph component.

6. The method of claim 5, further comprising incrementing the usage counter for the given graph component in response to the given graph component being loaded into the memory and setting the memory-state indicator to indicate that the given graph component is stored in the memory.

7. The method of claim 5, further comprising:

decrementing usage counters for the set of graph components in response to completion of the graph processing operation.

8. The method of claim 5, wherein the metadata further comprises:

a type of the given graph component, a modified indicator that indicates whether the given graph component has been modified, an external-state indicator that indicates whether the given graph component exists in external storage, or a dirty indicator that indicates whether the given graph component might be modified.

9. The method of claim 1, wherein the second subset of graph components are loaded into the memory in parallel.

10. The method of claim 1, wherein the set of graph components comprise at least one of:

a forward index that stores outgoing edges of a vertex, a reverse index that stores incoming edges of a vertex, a vertex key-mapping, a vertex property, or an edge property.

11. The method of claim 1, further comprising writing to a persistent storage a particular graph component that was altered during execution of the graph processing operation.

12. The method of claim 11, wherein writing the particular graph component to the persistent storage is performed asynchronously by a background thread.

13. The method of claim 1, wherein:

the graph processing operation comprises a graph query using breadth-first traversal, the set of graph components comprise graph components needed to perform a given vertex-and-edge matching stage of the graph query, and the set of graph components are marked as unused in response to completion of the given vertex-and-edge matching stage.

14. One or more non-transitory storage media storing instructions which, when executed by one or more computing devices, cause performance of:

maintaining metadata for a plurality of graph components, wherein the metadata comprises, for each given graph component, a memory-state indicator that indicates whether the given graph component is stored in memory;

identifying a set of graph components required to execute a graph processing operation on a graph by a job in a graph processing engine of a database system;

identifying, based on the metadata, a first subset of the set of graph components that are stored in the memory and a second subset of the set of graph components that are not stored in the memory;

determining an amount of memory needed to load the second subset of graph components into the memory;

reserving an amount of memory needed to load the second subset of graph components into the memory;

loading the second subset of graph components into the memory; and initiating execution of the graph processing operation using the set of graph components in the memory.

15. The one or more non-transitory storage media of claim 14, wherein:

a resource manager assigns an amount of memory needed to execute the graph processing operation;

reserving the amount of memory needed to load the second subset of graph components into the memory comprises requesting, from the resource manager, the amount of memory needed to load the second subset of graph components into the memory; and the resource manager assigns the amount of memory needed to load the second subset of graph components into the memory from the amount of memory assigned for the graph processing operation.

16. The one or more non-transitory storage media of claim 14, wherein the metadata further comprises:

a size of the graph component, and a usage counter indicating a number of jobs that are currently using the graph component.

17. The one or more non-transitory storage media of claim 16, further comprising incrementing the usage counter for the given graph component in response to the given graph component being loaded into the memory and setting the memory-state indicator to indicate that the given graph component is stored in the memory.

18. The one or more non-transitory storage media of claim 16, further comprising:

decrementing usage counters for the set of graph components in response to completion of the graph processing operation.

19. The one or more non-transitory storage media of claim 16, wherein the metadata further comprises:

a type of the given graph component, a modified indicator that indicates whether the given graph component has been modified, an external-state indicator that indicates whether the given graph component exists in external storage, or a dirty indicator that indicates whether the given graph component might be modified.

20. The one or more non-transitory storage media of claim 14, wherein:

the graph processing operation comprises a graph query using breadth-first traversal, the set of graph components comprise graph components needed to perform a given vertex-and-edge matching stage of the graph query, and the set of graph components are marked as unused in response to completion of the given vertex-and-edge matching stage.

\* \* \* \* \*